US009451818B2

(12) United States Patent
Buechin

(10) Patent No.: US 9,451,818 B2
(45) Date of Patent: Sep. 27, 2016

(54) PORTABLE COMPUTING DEVICE CASE CONVERTIBLE TO UPRIGHT STAND

(71) Applicant: RAKUTEN KOBO, INC., Toronto (CA)

(72) Inventor: Anna Buechin, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 8 days.

(21) Appl. No.: 14/255,688

(22) Filed: Apr. 17, 2014

(65) Prior Publication Data

US 2015/0296946 A1    Oct. 22, 2015

(51) Int. Cl.
*A45C 11/00* (2006.01)
*H04M 1/02* (2006.01)
*A45C 13/10* (2006.01)
*A45C 13/00* (2006.01)
*G06F 1/16* (2006.01)

(52) U.S. Cl.
CPC ........... *A45C 13/1069* (2013.01); *A45C 11/00* (2013.01); *A45C 13/005* (2013.01); *G06F 1/1626* (2013.01); *A45C 2011/003* (2013.01); *A45C 2200/15* (2013.01); *G06F 2200/1633* (2013.01); *G06F 2200/1634* (2013.01)

(58) Field of Classification Search
USPC .................. 206/320, 45.2, 45.23; 455/575.8; 248/174, 173, 440.1, 688, 682; 40/753, 40/768; 361/679.3, 679.26; D14/440; 281/37, 33
See application file for complete search history.

(56) References Cited

U.S. PATENT DOCUMENTS 472,470 A * 4/1892 Baum .................... B42F 13/002
281/33
2,256,513 A * 9/1941 Bauer ................... A47B 23/044
281/33

(Continued)

*Primary Examiner* — J. Gregory Pickett
*Assistant Examiner* — Gideon Weinerth
(74) *Attorney, Agent, or Firm* — Oblon, McClelland, Maier & Neustadt, L.L.P.

(57) ABSTRACT

A housing accessory convertible to a stand for a mobile computing device. The housing accessory includes a foldable cover member that has an upper portion, a flap portion, and a single folding hinge between the two portions and extending diagonally across the foldable cover. The flap portion can be rotated about the single holding hinge from a position coplanar with the upper portion to a folded position. Thereby the foldable cover is converted into a display stand operable to retain the mobile computing device in an inclined angle on a supporting surface.

14 Claims, 9 Drawing Sheets

(56) References Cited

U.S. PATENT DOCUMENTS

| | | | | |
|---|---|---|---|---|
| 2,375,190 A * | 5/1945 | Botts | B42D 3/126 | 281/33 |
| 2,979,343 A * | 4/1961 | Cline | B42F 13/402 | 281/33 |
| 3,686,783 A * | 8/1972 | Levy | G09G 1/12 | 40/746 |
| 3,785,605 A * | 1/1974 | Parekh | A47B 23/044 | 248/455 |
| 3,981,522 A * | 9/1976 | Bloom | B42D 3/126 | 248/451 |
| 4,014,120 A * | 3/1977 | Merz | | 40/750 |
| 4,377,271 A * | 3/1983 | Smith | B42F 13/402 | 248/460 |
| 4,905,389 A * | 3/1990 | Bisconti | | 40/753 |
| 5,533,288 A * | 7/1996 | Lambert | A47G 1/06 | 40/754 |
| 6,234,533 B1 * | 5/2001 | Torimoto | B42D 3/126 | 281/33 |
| 7,207,540 B2 * | 4/2007 | Thomas | A47B 23/043 | 108/180 |
| 8,162,282 B2 * | 4/2012 | Hu et al. | | 248/447 |
| 8,162,283 B1 * | 4/2012 | Royz | F16M 11/10 | 248/455 |
| 8,403,288 B2 * | 3/2013 | Cheng | F16M 11/10 | 248/673 |
| 8,490,783 B1 * | 7/2013 | Fan | | 206/45.23 |
| 8,567,748 B2 * | 10/2013 | Zhou et al. | | 248/688 |
| 8,714,510 B2 * | 5/2014 | McCosh | G06F 1/1626 | 206/45.23 |
| 8,727,116 B2 * | 5/2014 | Kim et al. | | 206/320 |
| D712,391 S * | 9/2014 | Kim et al. | | D14/250 |
| 8,902,575 B2 * | 12/2014 | Zhou | F16M 11/041 | 248/127 |
| 8,985,633 B2 * | 3/2015 | Bodziak | A45C 11/18 | 281/21.1 |
| D730,913 S * | 6/2015 | Shao | | D14/440 |
| D731,189 S * | 6/2015 | Kim | | D6/300 |
| 2002/0129530 A1 * | 9/2002 | Delozada | A47G 1/141 | 40/788 |
| 2003/0042729 A1 * | 3/2003 | Lin | B42F 13/402 | 281/33 |
| 2003/0057343 A1 * | 3/2003 | Jacobs | A47B 23/04 | 248/441.1 |
| 2003/0213886 A1 * | 11/2003 | Gilbert | A47B 23/044 | 248/454 |
| 2005/0001420 A1 * | 1/2005 | Gordon | B42D 3/126 | 281/33 |
| 2006/0285283 A1 * | 12/2006 | Simonian | A45C 3/02 | 361/679.55 |
| 2007/0295677 A1 * | 12/2007 | Kowatari | A47F 5/112 | 211/41.1 |
| 2010/0059649 A1 * | 3/2010 | Buxton | | 248/371 |
| 2010/0238119 A1 * | 9/2010 | Dubrovsky | G06F 1/1626 | 345/169 |
| 2010/0300909 A1 * | 12/2010 | Hung | B65D 25/00 | 206/320 |
| 2011/0297564 A1 * | 12/2011 | Kim | A45C 11/00 | 206/320 |
| 2013/0075543 A1 * | 3/2013 | Krohn | G06F 1/1632 | 248/121 |
| 2013/0140194 A1 * | 6/2013 | Han | | 206/45.23 |
| 2013/0258586 A1 * | 10/2013 | Shao | A45C 11/00 | 361/679.55 |
| 2013/0264459 A1 * | 10/2013 | McCosh et al. | | 248/688 |
| 2013/0301204 A1 * | 11/2013 | Yim | G06F 1/1601 | 361/679.26 |
| 2014/0004915 A1 * | 1/2014 | Huang | | 455/575.8 |
| 2014/0036429 A1 * | 2/2014 | Bryan | A45C 13/1069 | 361/679.3 |
| 2014/0043741 A1 * | 2/2014 | Smith | G06F 1/1626 | 361/679.3 |
| 2014/0132133 A1 * | 5/2014 | Chiou | | 312/223.2 |
| 2014/0200056 A1 * | 7/2014 | Liu | H04B 1/3877 | 455/575.8 |
| 2014/0284228 A1 * | 9/2014 | Chiou | G06F 1/1626 | 206/45.23 |
| 2014/0291172 A1 * | 10/2014 | Rogers | | 206/37 |
| 2014/0311927 A1 * | 10/2014 | Kang | G06F 1/00 | 206/45.28 |
| 2014/0347814 A1 * | 11/2014 | Zaloom | G06F 1/1626 | 361/679.56 |
| 2015/0085436 A1 * | 3/2015 | Dong | G06F 1/166 | 361/679.3 |
| 2015/0092326 A1 * | 4/2015 | Mantha | G06F 1/1616 | 361/679.3 |
| 2015/0092346 A1 * | 4/2015 | Ben | G06F 1/1626 | 361/679.55 |
| 2015/0122850 A1 * | 5/2015 | Quehl | A45C 11/00 | 224/191 |
| 2015/0141092 A1 * | 5/2015 | Murauyou | G06F 1/1681 | 455/575.8 |
| 2015/0151871 A1 * | 6/2015 | Huang | H05K 5/0086 | 206/45.23 |
| 2015/0177784 A1 * | 6/2015 | Varadarajan | G06F 1/1626 | 361/679.3 |
| 2015/0189781 A1 * | 7/2015 | Klepar | G06F 1/16 | 206/45.2 |
| 2015/0198973 A1 * | 7/2015 | Le | G06F 1/1601 | 248/688 |
| 2015/0237979 A1 * | 8/2015 | Huang | A45C 11/00 | 206/45.25 |

\* cited by examiner

PORTABLE COMPUTING DEVICE CASE CONVERTIBLE TO UPRIGHT STAND

TECHNICAL FIELD

The present disclosure relates generally to the field of electronic device accessories, and, more specifically, to the field of electronic device stands.

BACKGROUND

Mobile computing devices, such as laptops, PDAs, media players, game consoles, touchpads, smartphones, e-readers etc., have evolved to become more and more sophisticated. With the rapidly developing technologies on Internet data storage, data transmission, and wireless communication as well as on data-handling capabilities of mobile computing devices, consumers increasingly spend extended time using such devices, such as watching videos, viewing photos, video conferencing, reading books, Internet browsing, sending emails, on-line chatting, playing video games, etc.

To suit consumers' demand for portability, the design trend of various mobile computing devices continues to emphasize making the devices smaller and thinner. Most modern portable computing devices are installed with a touchscreen panel that is fixed to the device body. To view the display screen hands-free in an ergonomic view angle to reduce related visual discomforts, a user usually needs to position the device in an inclined angle (or an upright position) on a horizontal resting surface, e.g., a desk.

Most mobile computing device products are not equipped with a built-in stand for supporting the device in an upright position. External accessories of various configurations are typically used to prop such a device in a user-intended orientation. In some of the accessory products, a stand is integrated with a protective case customized for a device model; while others are designed exclusively as a stand.

FIG. 1 illustrates several configurations of mobile computing device stands 110-140 capable of supporting computing devices in upright positions on external horizontal surfaces in accordance with the prior art. FIG. 2 illustrates several configurations of mobile computing device protective cases 210A and 220A capable of converting to stands 210B and 220B respectively for supporting the associated devices in upright positions in accordance with the prior art.

As shown, the existing stands have multi-fold and complicated configurations. It is often difficult and time-consuming for a user to figure out the proper way to set up such a stand for use or put it away for transport. In addition, a complicated design often leads to increased manufacturing cost.

SUMMARY OF THE INVENTION

Therefore, it would be advantageous to provide an apparatus operable to retain a portable electronic device in an upright position yet with a simplified design configuration.

Embodiments of the present disclosure employ a one-fold stand structure on a foldable hard cover designed as an accessory for a mobile computing device. The foldable hard cover may serve as a front cover for example to protect the display screen of the computing device in a covered position and as a stand in open display position. The foldable cover includes an upper portion, a flap portion, and a single folding hinge between the two portions and extending diagonally across the foldable cover. The flap portion can be rotated about the single holding hinge between a coplanar position with the upper portion and a folded position. Being folded twice, the foldable cover is converted into a display stand operable to retain the device in an inclined angle on a supporting surface, thus providing a comfortable view angle to a device user. The flap portion may be the lower portion of the front cover or an extra layer coupled to the front cover at the single folding hinge. Further, the foldable front cover may be coupled to a back cover through a hinge spine. The back cover may be non-foldable or alternatively have the same folding configuration and thus can fold in unison with the front cover into a stand.

According to one embodiment of the present disclosure, an accessory for a portable computing device comprises: (1) a back cover comprising an inner surface, a outer surface, and a coupler configured to detachably affix to the portable computing device with the inner surface facing a back side of the portable computing device; (2) a front cover comprising: an upper portion; a flap portion; and a single folding hinge extending approximately diagonally across the front cover and between the upper portion and the flap portion, wherein the flap portion is rotatable around the single folding hinge between a coplanar position with the upper portion and a folded position; and (3) a hinge spine coupling the front cover and the back cover together. The front cover is rotatable around the hinge spine between a covered position and an open display position with reference to the back cover. The front cover at the covered position is configured to cover a front side of the portable computing device. The flap portion in the folded position enables the front cover in the open display position to retain the portable computing device at an inclined angle with reference to a supporting surface.

In one embodiment, the single folding hinge may divide the front cover into the upper portion and a lower portion, and the flap portion is the lower portion. The front cover may comprise a magnet. When the front cover is at the open display position, the upper portion is operable to be conformal to the back cover by force of the magnet. The coupler may comprise tabs on opposite edges of the back cover, and wherein the tabs are configured to retain the portable computing device within the back cover by holding bezels of the portable computing device. An angle between the flap portion and the upper portion may be approximately 130° when the flap portion is in the folded position. The flap portion is operable to hold the portable computing device in a portrait viewing mode when the first edge of the flap portion contacts the supporting surface, and operable to hold the portable computing device in a landscape viewing mode when its second edge contacts the supporting surface. Further, the back cover may comprise a diagonal folding hinge dividing the back cover into an upper section and a lower section.

According to another embodiment of the present disclosure, a housing accessory for a mobile computing device comprises a back cover and retaining means coupled to the back cover and operable to removably mount and secure the back cover to the mobile computing device. In one example, the back cover comprises: four edges including a first pair of parallel edges and a second pair of parallel edges; a single folding hinge extending in an angled direction relative to the four edges and dividing the back cover into an upper segment and a lower segment. The upper segment and the lower segment comprise rigid materials. The lower segment is operable to rotate about the single folding hinge between a coplanar position and an angled position with reference to the upper segment. The lower segment at the angled position is operable to support the mobile computing device in an inclined position with reference to an external supporting surface.

According to another embodiment of the present disclosure, a protective case for a portable computing device comprises (1) a back cover comprising a first inner surface, a first outer surface, and a coupler configured to detachably affix the portable computing device to the back cover with the first inner surface operable for facing a back side of the portable computing device; and (2) a front cover rotatably coupled to the back cover and comprising short edges parallel to each other and long edges parallel to each other. The front cover further comprises a second inner surface and a second outer surface. The front cover is configured to rotate between a cover position and a view position relative to the back cover. The second inner surface is configured to face a display screen of the portable computing device when the front cover is at the cover position. The front cover comprises: an upper panel; a lower panel; and a single folding line extending in an angled direction with reference to both the short edges and the long edges. The lower panel is rotatable around the single folding line towards the second inner surface between a coplanar position and a stand position. The lower panel at the coplanar position is coplanar with the upper panel. When the front cover is at the view position, the lower panel at the stand position is operable to support the portable computing device in an inclined position with reference to an external horizontal surface in both a portrait view orientation and a landscape view orientation.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
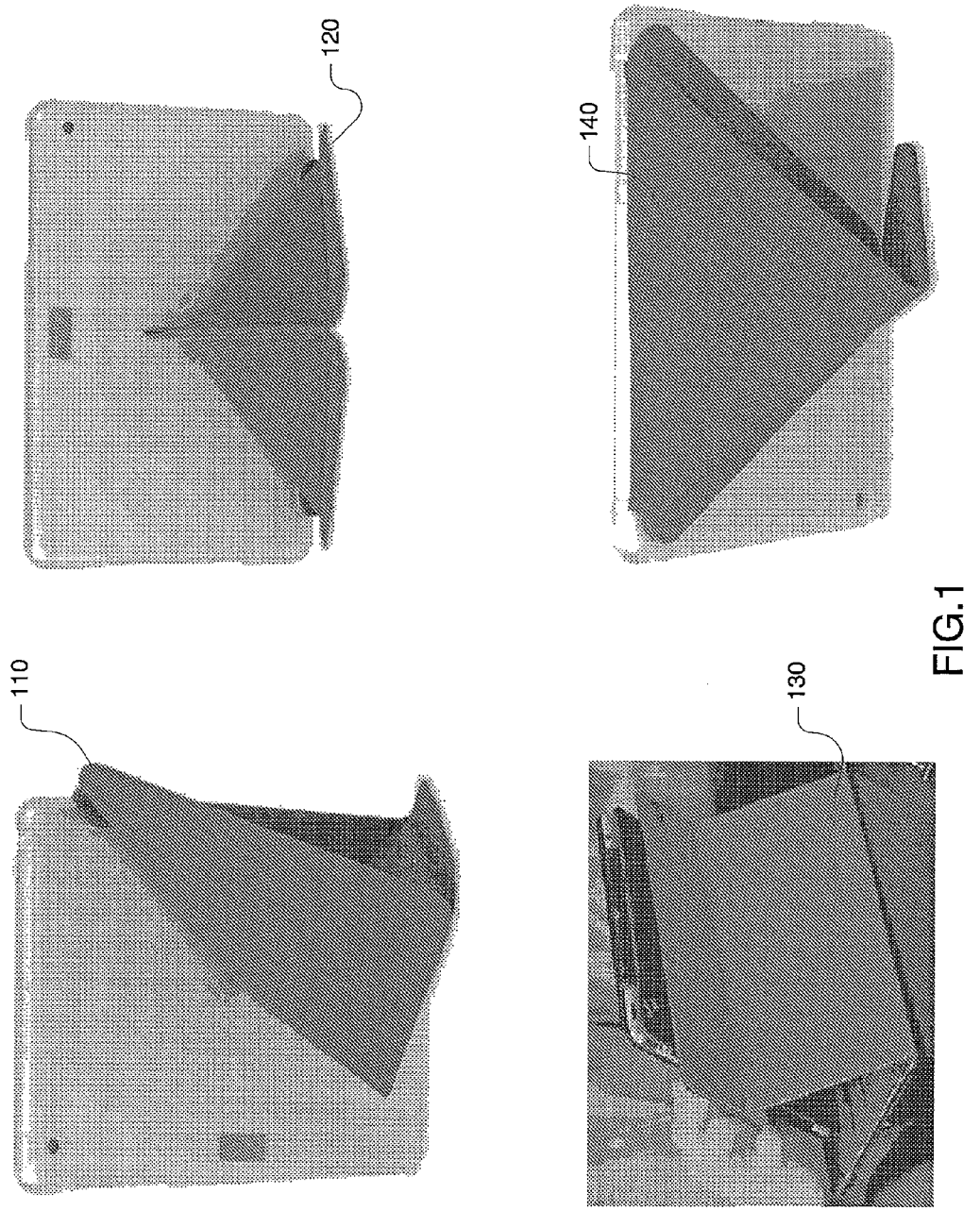
FIG. 1 illustrates several configurations of mobile computing device stands capable of supporting the computing devices in upright positions on horizontal surfaces in accordance with the prior art.
Figure 2:
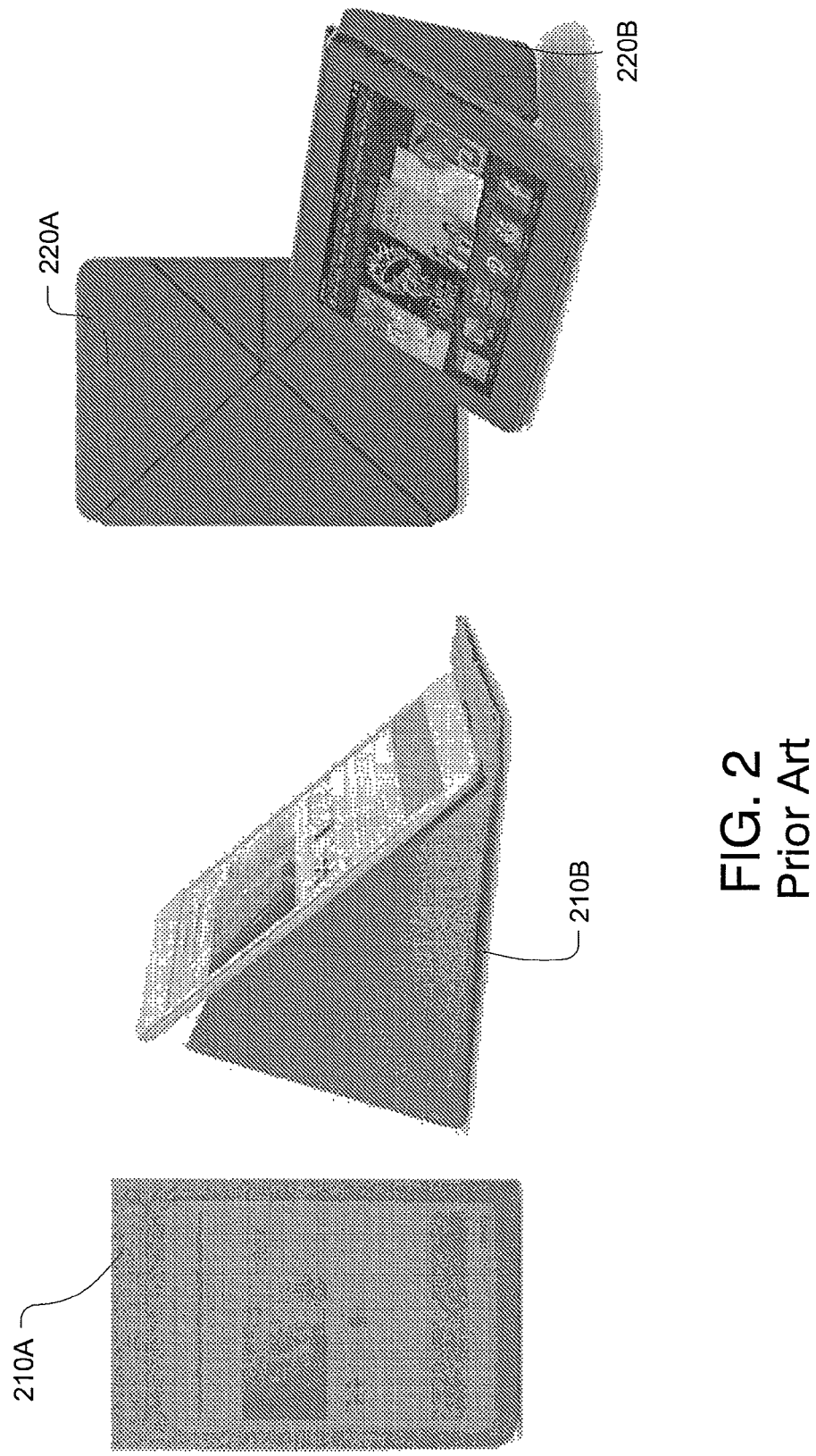
FIG. 2 illustrates several configurations of mobile computing device protective cases capable of converting to stands respectively for supporting the associated devices in upright positions in accordance with the prior art.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Portable Computing Device Case Convertible to Upright Stand

Overall, provided herein is a mobile computing device protective case with at least one foldable cover having an angled folding hinge around which a flap member of the foldable cover can rotate to a folded position. Thereby, the foldable cover is converted to a stand operable to support the mobile computing device at an inclined angle with reference to a supporting surface.

Figure 3A:
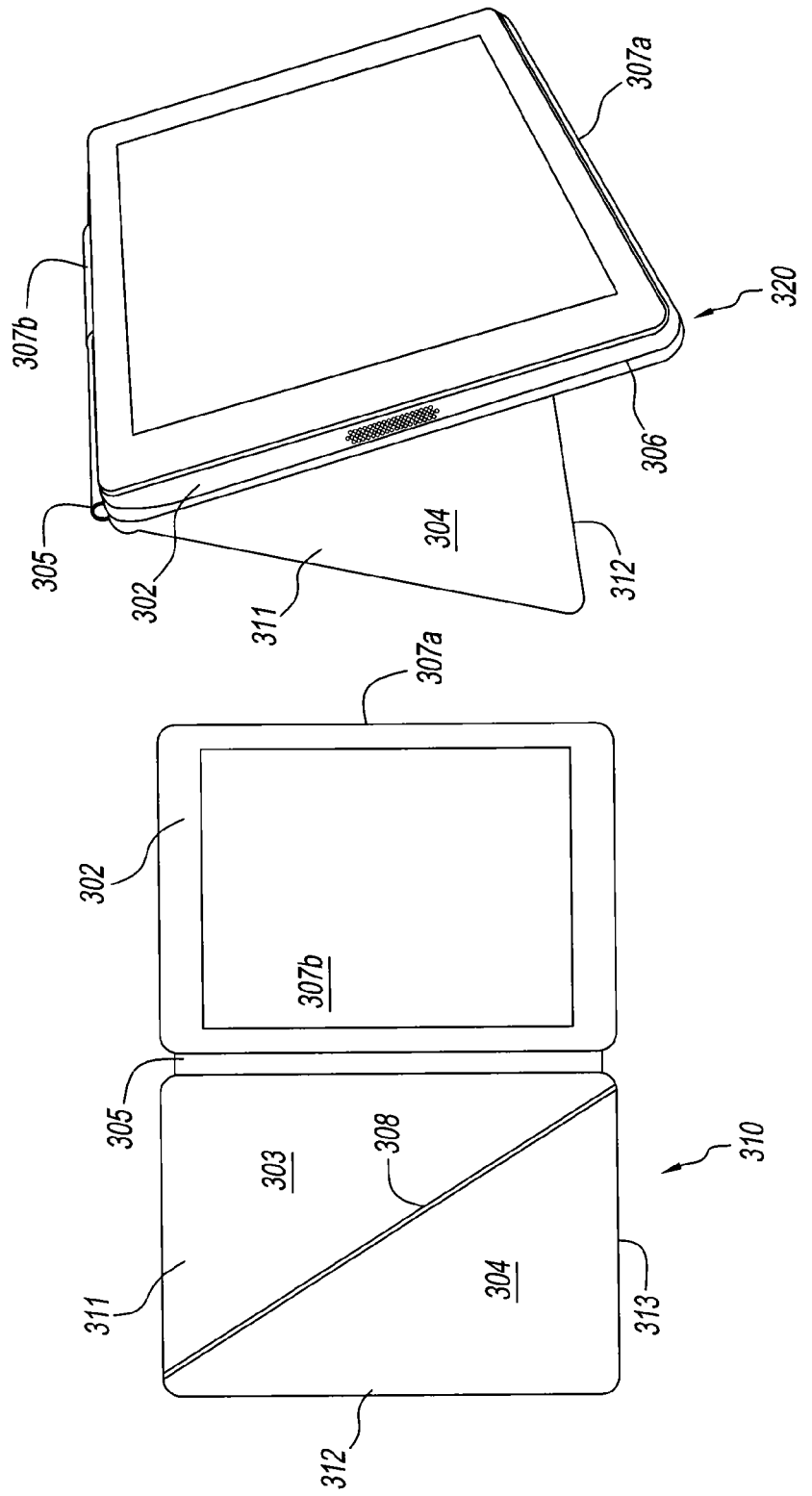
FIG. 3A are front view images showing an exemplary protective case having a diagonal folding hinge on the front cover and operable to protect the tablet as well as support it in an upright position in accordance with an embodiment of the present disclosure.

FIG. 3A illustrates front view images 310 and 320 showing an exemplary protective case having a diagonal folding hinge 308 on the front cover 311 and operable to protect the tablet 302 as well as support it in an upright position in accordance with an embodiment of the present disclosure.

The image 310 shows that the protective case 300 has a front cover 311 and a back cover 306 that are rotatably coupled together through a hinge spine 305. The tablet 302 is detachably affixed (snapped in) and secured to the back cover 306 via the tabs 307A and 307B. The front cover 311 has a single folding hinge 308 that divides the front cover into an upper portion 303 next to the hinge spine 305 and a lower portion 304.

The folding hinge 308 of the cover runs approximately diagonally across the front cover 311 and terminates near two opposite edges of the rectangular front cover 311. The lower portion has an edge 312 that coincides with a long edge of the front cover 311, and another edge 313 that coincides with a substantial portion of a short edge of the front cover 311.

When the tablet 302 is not in use, the two portions 303 and 304 of the front cover 311 are coplanar and can advantageously cover the entire display screen (the front side) of the tablet 302 to protect it from external damage. Also, the back cover 306 is used to protect the back side of the tablet 302.

When the tablet is in use and particularly with the display screen on, the front cover 311 can be rotated around the hinge spine 305 to an open display position to uncover the display screen, as shown by image 310 or 320). If the user intends to retain the tablet 302 in an upright position hands-free, the front cover 311 can be rotated further towards the back side of the tablet 302, and the lower portion 304 can be rotated relative to the upper portion 303 around the folding hinge 308 to a folded position (see image 320). That is, subject to a single fold, the front cover 311 is converted into a sturdy supporting stand. As shown in image 320, the lower portion 304 at the folded position has only the edge 312 directly contacting the supporting surface. As a result, the tablet 302 can advantageously rest on the external supporting surface in an inclined angle.

Figure 3B:
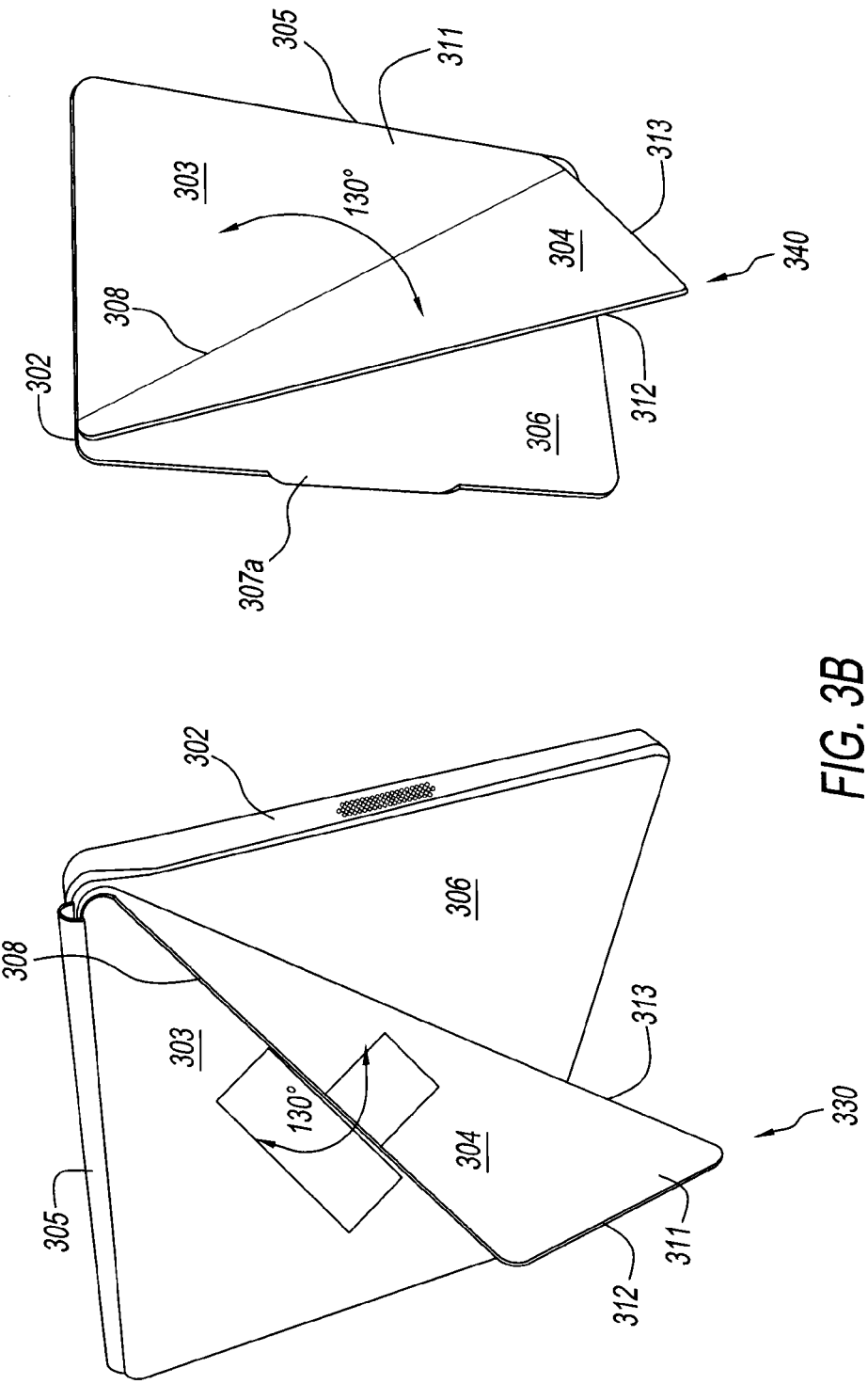
FIG. 3B are back view images showing that the front cover with the lower portion in a single folded position can uprightly support a tablet in both portrait and landscape orientations.

FIG. 3B illustrates back view images 330 and 340 showing that the front cover 311 with the lower portion 304 in a single folded position can uprightly support a tablet in both portrait and landscape orientations. The lower portion 304 and the upper portion 303 form an angle of 130° at the instant folded position. Without changing the folded position of the lower portion relative to the upper portion, the front cover 311 can support the tablet in an upright position in both a portrait view mode (see image 340) and a landscape view mode (see image 330). That is, a user can change a view orientation of the tablet without readjusting the folding angle of the front cover. However in some other embodiments, a portrait view mode and a landscape view mode may require the front cover be folded in different angles to achieve stability.

For purposes of practicing the present disclosure, a protective case and the associated components can be manufactured by any suitable processes and materials that are well known in the art. In the illustrated embodiment, the back cover 306 primarily has a rigid and non-foldable panel. One or more magnets may be installed (e.g., embedded) in the front cover 311 and/or the back cover 306 such that the upper portion 303 can be conformal to the back cover 306 by force of the magnets. It will be appreciated that the upper portion 303 may detachably adhere to the back cover 306 by any other suitable means that is well known in the art.

At the illustrated folded position, the upper portion 303 and the lower portion 304 form an angle of 130°, which also happen to be the stop position for the lower portion in this example. A continuous range of stable view angles may be achieved as a user adjust the lower portion between the position coplanar with the upper portion and the stop position. It will be appreciated that the stop position, or the rotation limit of the lower portion, is dependent on the configuration of the foldable cover. During the product design for a protective case according to the present disclosure, a stop position can be determined by factoring in the weight and dimension of the mobile computing device, the geometry, location and orientation of the folding hinge, the materials used to manufacture the front cover and the back cover, the range of inclined angles to be achieved, and etc.

The protective case 300 may be made of soft materials (for exterior and interior surfaces) covering one or more rigid panels or reinforcement structures. The soft materials may include one or more of polyurethane (PU) laminate, neoprene, silicone, microfiber cloth, leather, rubber, vinyl, polyvinyl chloride (PVC), plastic, etc. The reinforcement structure may include one or more of stiff polycarbonate (PC) or other plastic, wood, metal, etc.

The folding hinge area may include only the soft materials and lack a reinforcement structure. The tabs 307A and 307B may be molded as an integral part of the reinforcement structure of the back cover 306 and may not be covered by a soft material. Alternatively, the tabs may be made of separate reinforcement structures that are permanently bonded to the reinforcement structure in a suitable manner that is well known in the art.

In some embodiments, the upper portion and the lower portion of a front cover may have different materials in their respective reinforcement structures, for instance an EVA foam sheet for the lower portion and polycarbonate for the upper portion.

It will be appreciated that the configuration of a convertible protective case can be customized for a single or multiple mobile device models. A protective case can be designed for any type of mobile electronic device, such as tablet computer, touchpad, smartphone, e-reader, laptop, GPS, PDA, and etc.

Various structures can be utilized in a convertible protective case to accommodate and secure a mobile computing device according to the present disclosure. For instance, instead of protruding tabs, a protective case may have a sleeve made of a soft material attached to the back cover. The sleeve can hold the device on the bezels and have an opening for the display panel. The sides of the sleeve can have slots that allow access to ports and like features of the mobile computing device.

Figure 4:
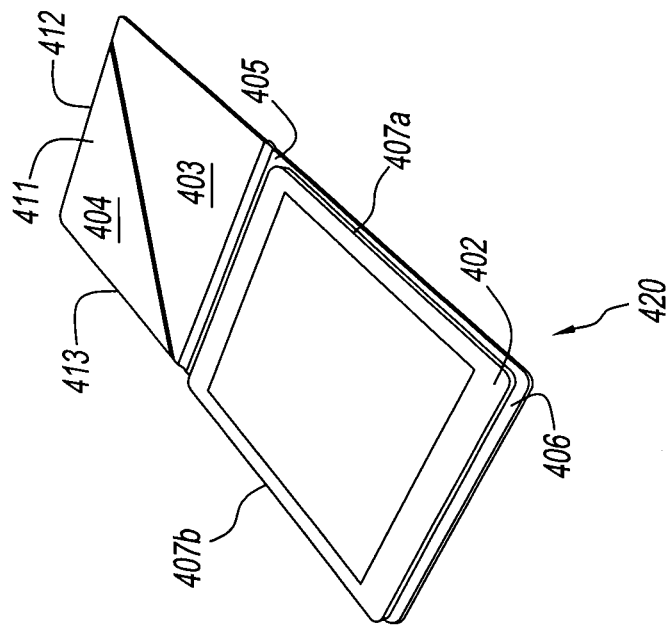
FIG. 4 are images showing an exemplary protective case having a single folding hinge on the front cover and operable to uprightly support a mobile computing device in accordance with another embodiment of the present disclosure.
Figure 4:
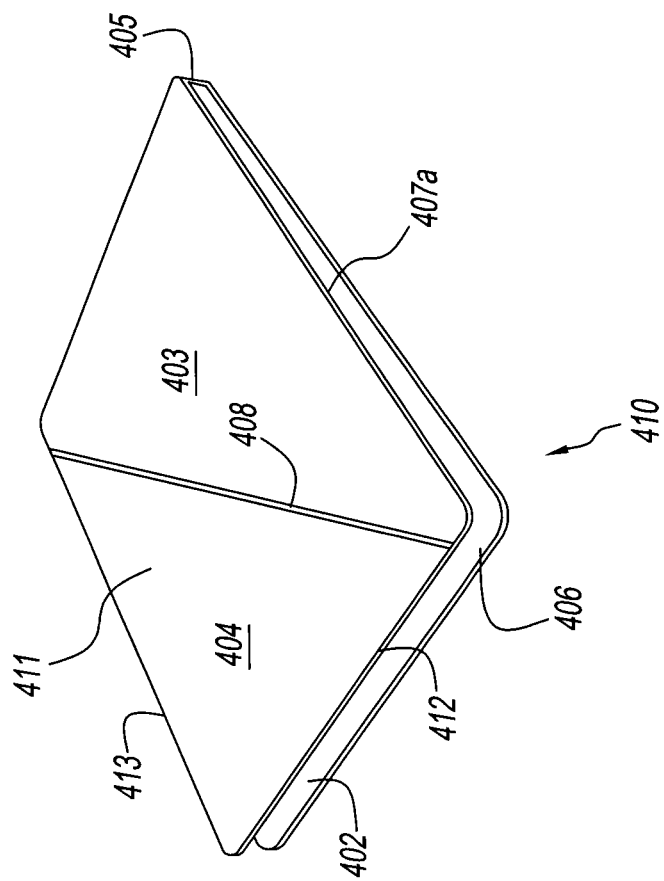

FIG. 4 illustrates images 410 and 420 showing a exemplary protective case 400 having a single folding hinge 408 on the front cover 411 and operable to support a mobile computing device in an upright position in accordance with another embodiment of the present disclosure. The image 410 shows the protective case 400 at a covered position, and the image 420 shows the protective case at an open display position. The protective case 400 has the similar configuration with the protective case 300 but with the hinge spine 405 parallel to the short edges of the front cover 411 and back cover 406. The protruding tabs 407A and 407B are located at the long edges of the back cover 406.

The front cover 411 has a diagonal folding hinge 408 that divides the cover into an upper portion 403 and lower portion 404. The folding hinge 408 terminates at adjacent edges of the front cover 411. When the front cover is used to support the mobile computing device 402 in an upright position (not shown), the lower portion is rotated around the folding hinge 408 to a folded position with either the edge 413 or the edge 412 contacting the supporting surface.

Figure 5A:
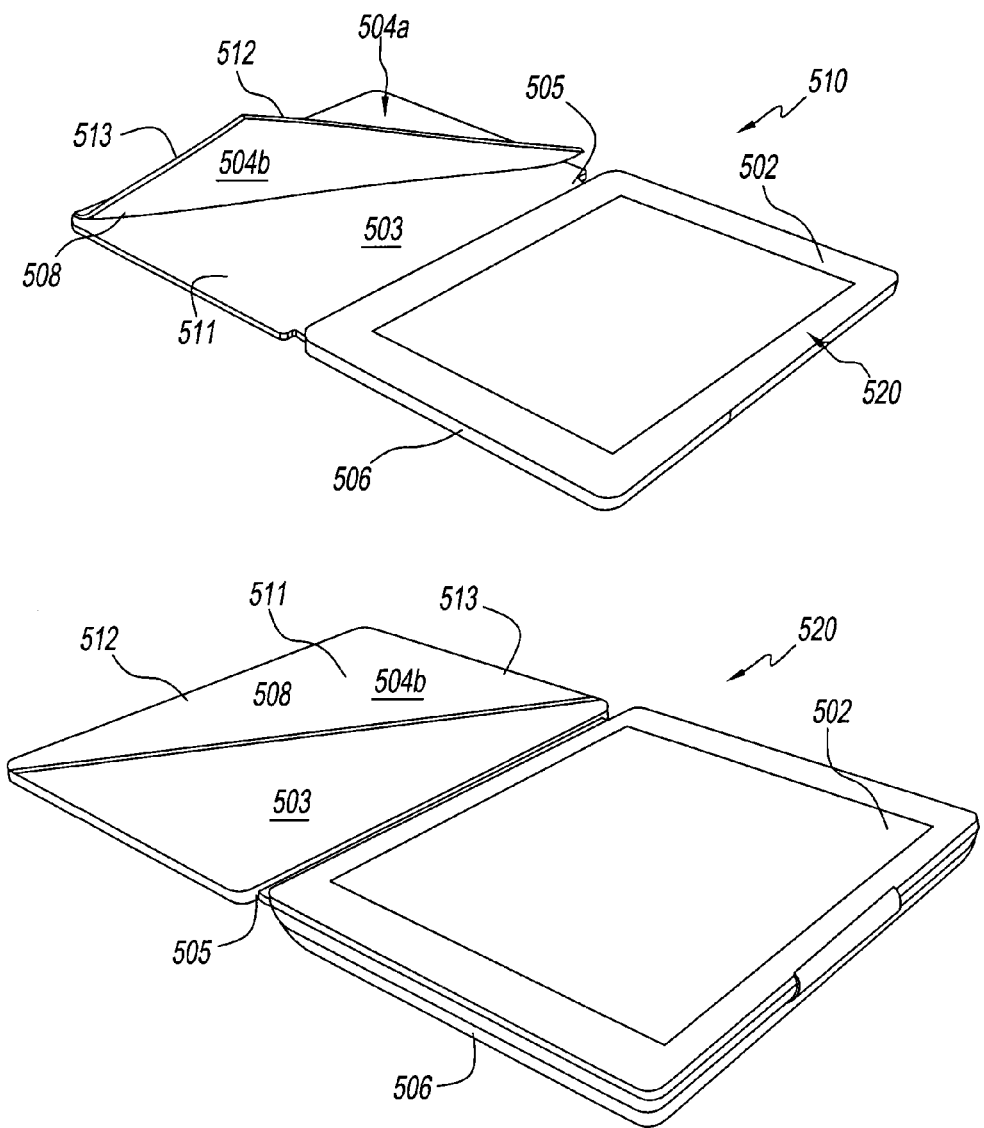
FIG. 5A are front view images showing an exemplary protective case having an extra flap member and operable to uprightly support a mobile computing device in an upright position in accordance with an embodiment of the present disclosure.

FIG. 5A illustrates front view images 510 and 520 showing an exemplary protective case 500 having an extra flap member 504B and operable to support a mobile computing device 502 in an upright position in accordance with an embodiment of the present disclosure. The front cover 511 is placed at an open display position in both images 510 and 520.

The front cover 511 has a base member, a flap member 504, and a diagonal folding hinge 508. The folding hinge 508 divides the base member into an upper portion 503 and a lower portion 504A. The base member has a unitary planar reinforcement structure and thus the two portions 503 and 504A are unmovable relative to each other. The flap member 504B can rotate around the folding hinge 508 from the position coplanar with the base member (see image 520) to a folded position (see image 510) until a stop position. During manufacturing, the flap member may be glued or fused to the base member, or be coupled to the base member any other suitable means.

In some embodiments, the flap member 504B is configured to have the same dimension as the lower portion 504A and completely overlay the lower portion 504A when at the coplanar position, as shown in image 520. However, in some other embodiments, the flap member 504B may have a different shape and/or size with the lower portion 504A. In some embodiments, the flap member and the base member are made from different reinforcement structure materials and/or exterior surface materials. The flap member 504B and the base member may be installed with one or more magnets which can hold them together at the coplanar position as shown in image 520.

Figure 5B:
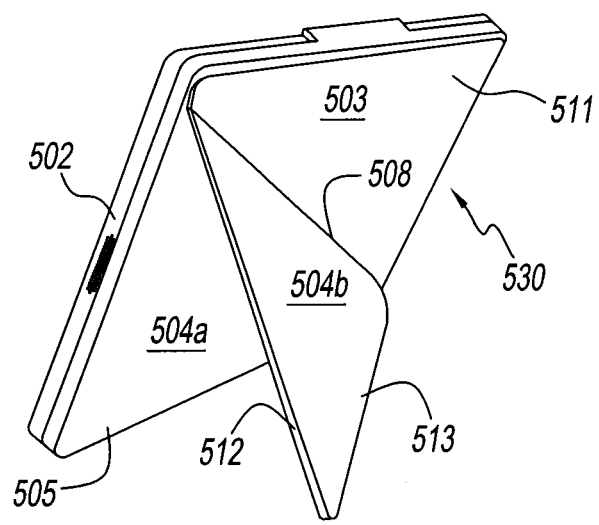
FIG. 5B are back view images showing that the front cover with the flap portion in a folded position can uprightly support a mobile computing device in both a landscape view orientation and a portrait view orientation.
Figure 5B:
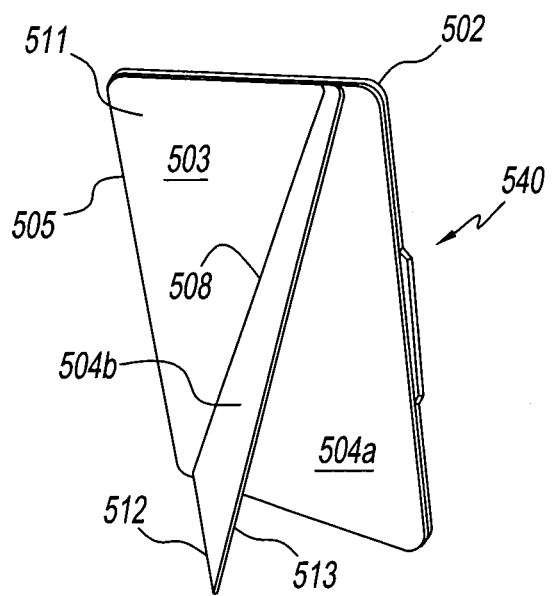

FIG. 5B are back view images 530 and 540 showing that the front cover 511 with the flap portion 504B in a folded position can uprightly support a mobile computing device 502 in both a landscape view orientation and a portrait view orientation. The images 530 and 540 show that the base member (including 503 and 504A) of the front cover 511 completely overlaps the back cover 506, for example by magnetic force. The flap member 504B extends outward and serves as an easel with either edge 513 or edge 512 touching the supporting surface.

Figure 6:
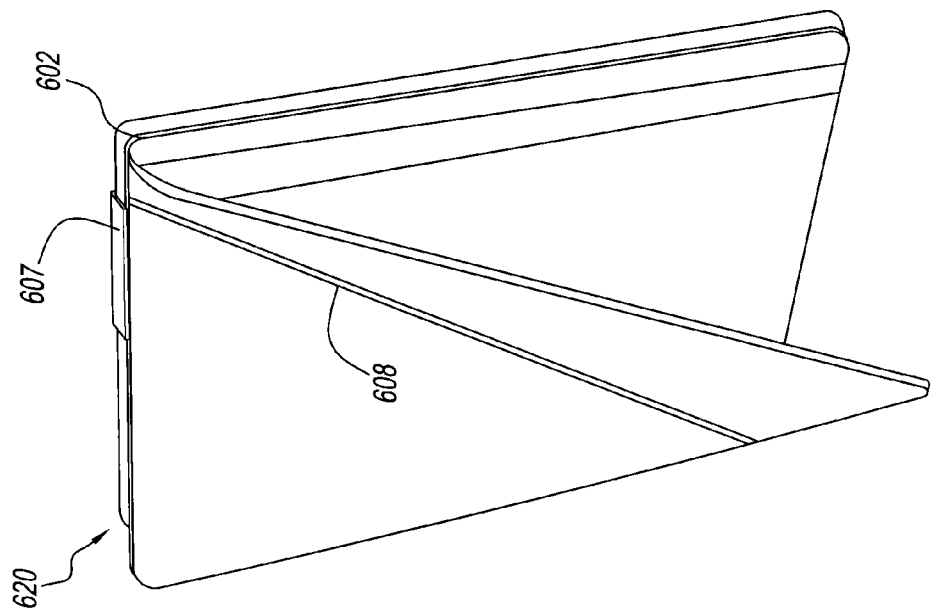
FIG. 6 are images showing an exemplary protective case having a front cover and a back cover operable to fold in unison to uprightly support a mobile computing device in accordance with an embodiment of the present disclosure.
Figure 6:
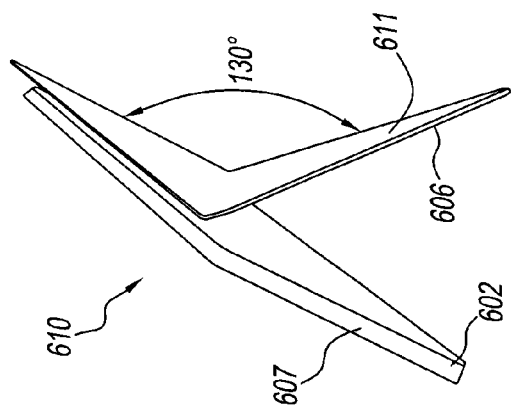

In the examples shown above, the back covers are all non-foldable. FIG. 6 illustrate images showing an exemplary protective case having a front cover 611 and a back cover 606 operable to fold in unison to uprightly support a mobile computing device in accordance with an embodiment of the present disclosure.

In this example, each of the front cover 611 and the back cover 606 has a folding hinge dividing the cover into an upper portion and a lower portion. The upper portions, the lower portions and the folding hinges of the two covers 611 and 606 respectively have similar geometric configurations.

At an open display position (image 610 and image 620), the front cover 611 and the back cover 606 are held together by force of the magnets (not explicitly shown) installed therein. The lower portions of both covers can rotate along respective folding hinges concurrently from the original coplanar position to a folded position (e.g., 140° angle between the upper and lower portions) and server to support the mobile computing device 602.

The protective case 600 has an elongated clip 607 bonded to the upper portion of the back cover and used to retain the mobile computing device 602. The device 602 can snap in or slide in the clip to be coupled to the protective case. The clip 607 is a unitary rigid structure (e.g., made of polycarbonate or other type of molded plastic) with a uniform width.

Figure 7:
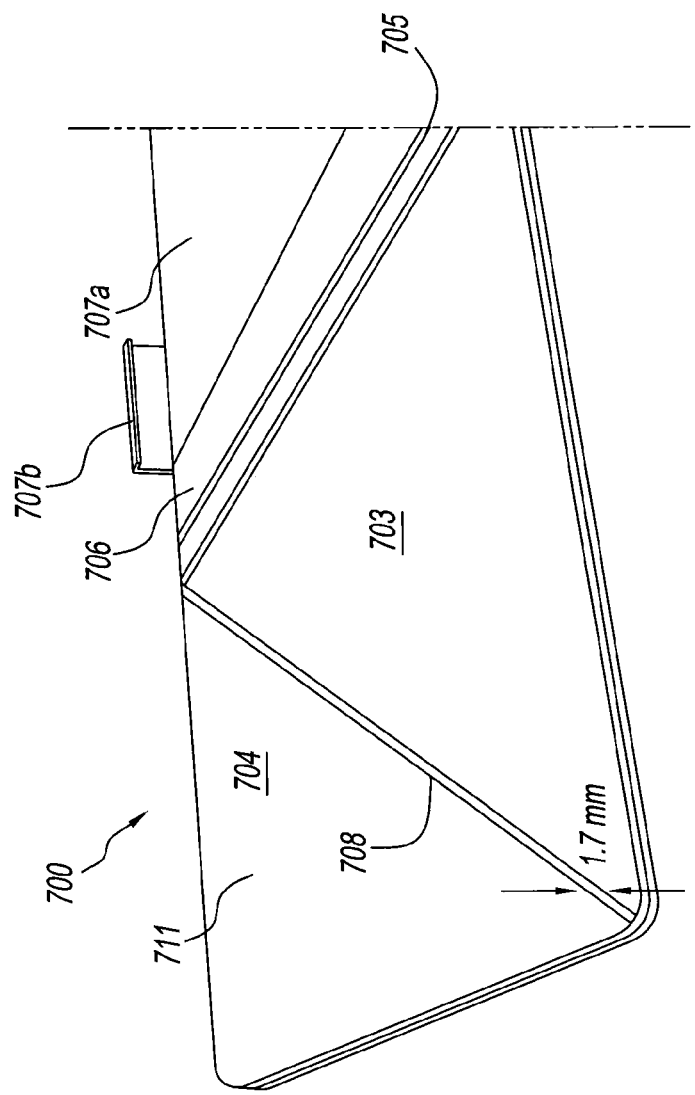
FIG. 7 is an image showing the interior of an exemplary protective case in accordance with an embodiment of the present disclosure.

FIG. 7 is an image showing the interior of an exemplary protective case 700 in accordance with an embodiment of the present disclosure. The protective case 700 has a front cover 711, a back cover 706, a device holder, and a hinge spine 705. The device holder has a flat panel 707A along the length of the back cover and tabs 707B at the ends of the panel. The flat panel is bonded with the back cover 706. The tabs protrude upwards for receiving and retaining a mobile computing device.

The front cover 711 has a diagonal folding hinge 708 which is a visible groove formed between the two reinforcement structures of the upper 703 and lower portions 704 of the front cover 711. In this particular example, the depth of the groove is 1.7 mm, which in conjunction with the width of the groove determines a rotation range of the lower portion (or the stop position) of about 50°. The material at the groove (e.g., plastic, fabric, leather) is flexed, allowing the two portions of the front cover to rotate relative to each other. In some other embodiments, the groove may be covered by a flexible material and externally invisible.

It will be appreciated that various other sorts of hinges can be used to implement the present disclosure. The folding hinge and/or the spine hinge can be fabric hinges, living hinges, plano hinges, continuous hinges, butt hinges, butterfly hinges, flush hinges, concealed hinges, barrel hinges, spring hinges, etc. The folding hinge and/or the spine hinge can be made from materials selected from fabric, leather, synthetic leather, microfiber or polyester, metal, plastic, rubber, silicone, carbon fiber, and many others.

The forgoing exemplary protective cases described in detail have book style configurations, featuring a front cover and a back cover coupled together through a hinge spine. In some other embodiments, the protective case can be configured in a pocket, wallet, bag, or frame, jacket style. For instance, the two covers of the case can be zipped together for storing the mobile computing device and unzipped for open display. Either or both of the two covers can be foldable around a single folding hinge to make an easel for supporting the mobile computing device in upright positions.

In still some other embodiments, a protective case may have no front cover but contain only a foldable back cover with a single angled folding hinge, e.g., a so-called bumper case. The foldable back cover may have a coupling means (e.g., the clips/tabs as in FIG. 6) which couples a mobile computing device to the foldable back cover. A portion of the single foldable back cover can rotate around the folding hinge to a folded angle and support the mobile computing device in an inclined view angle.

It will be appreciated that a protective case according to the present disclosure may include any other components that are well known in the art, e.g. pockets to hold a pen or business cards.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A protective case for a portable computing device, said protective case comprising:
a back cover configured to accommodate said portable computing device and protect a backside thereof; and
a front cover coupled to said back cover and configured to rotate relative to said back cover between a covered position and an open view position, said front cover includes an upper panel and a lower panel,
wherein at said open view position, said front cover is configured to uprightly support said portable computing device in both a portrait view orientation and a landscape view orientation on a supporting surface upon being folded once along a single folding line across said front cover into a folded position,
wherein said single folding line divides said front cover into an upper panel and a lower panel that is rotatable around said single folding line relative to said upper panel
wherein said back cover comprises a folding hinge dividing said back cover into an upper section and a lower section, and wherein,
when said front cover is at said folded position:
said upper panel overlaps said upper section;
said lower panel overlaps said lower section; and
said folding hinge overlaps said single folding line.

2. The protective case of claim 1, wherein said front cover comprises two long edges and two short edges, and wherein said single folding line extends substantially in a diagonal direction of said front cover and terminates on adjacent edges of said front cover.

3. The protective case of claim 1, wherein said back cover and said front cover comprise magnets configured to cause said upper panel to directly contact said back cover when said front cover is at said open view position, and wherein further said upper panel and said lower panel comprise different rigid materials.

4. The protective case of claim 1 further comprising a hinge spine parallel to two long edges of said front cover.

5. An accessory for a portable computing device: said accessory comprising:
a back cover comprising an inner surface, an outer surface, and a coupler configured to detachably affix to said portable computing device with said inner surface facing a back side of said portable computing device;
wherein said back cover includes a flap portion coupled to said outer surface, said flap portion being rotatable around a rear folding hinge between an unfolded position and a folded position,
wherein said rear folding hinge extends approximately diagonally across said back cover,
wherein said flap portion at least partially overlaps with said back cover at said unfolded position,
a front cover comprising: an upper portion; a lower portion; and a single folding hinge extending approximately diagonally across said front cover and between said upper portion and said lower portion, wherein said lower portion is rotatable around said single folding hinge between a coplanar position with said upper portion and a folded position; and
a hinge spine coupling said front cover and said back cover together,
wherein said front cover is rotatable around said hinge spine between a covered position and an open display position with reference to said back cover,
wherein said front cover at said covered position is configured to cover a front side of said portable computing device,
wherein said lower portion in said folded position enables said front cover in said open display position to retain said portable computing device at an inclined angle with reference to a supporting surface, and
wherein, when said front cover is at said folded position, said flap portion overlaps said lower portion, and said single folding hinge overlaps said rear folding hinge.

6. The accessory of claim 5, wherein said front cover comprises a magnet, and wherein, when said front cover is at said open display position, said upper portion is operable to be conformal to said back cover by force of said magnet.

7. The accessory of claim 5, wherein said coupler comprises tabs on opposite edges of said back cover, and wherein said tabs are configured to retain said portable computing device within said back cover by holding bezels of said portable computing device.

8. The accessory of claim 5, wherein an angle between said lower portion and said upper portion is approximately 130" when said lower portion is in said folded position.

9. The accessory of claim 5, wherein said back cover is in a rectangular shape with long edges and short edges,
wherein said flap portion comprises: a first edge coinciding with a short edge of said back cover; and a second edge coinciding with a portion of a long edge of said back cover,
wherein said flap portion is operable to hold said portable computing device in a portrait viewing mode when said first edge contacts said supporting surface, and
wherein said flap portion is operable to hold said portable computing device in a landscape viewing mode when said second edge contacts said supporting surface.

10. A housing accessory for a mobile computing device, said housing accessory comprising:
a back cover comprising:
four edges including a first pair of parallel edges and a second pair of parallel edges;
a single folding hinge extending in an angled direction relative to said four edges and dividing said back cover into an upper segment and a lower segment,
wherein said upper segment and said lower segment comprise rigid materials, wherein said lower segment is operable to rotate about said single folding hinge between a coplanar position and an angled position with reference to said upper segment, wherein said lower segment at said angled position is operable to support said mobile computing device in an inclined position with reference to an external supporting surface; and
retaining means coupled to said first pair of parallel edges and operable to removeably mount and secure said back cover to said mobile computing device,
wherein said front cover comprises a single folding line dividing said front cover into an upper panel and a lower panel that is rotatable around said folding line to a folded position, and
wherein, when said front cover is at said open display position; said lower panel at said folded position is configured to overlap with said lower segment at said angled position; said upper panel is configured to overlap with said upper segment: and said folding line is configured to overlap with said single folding hinge.

11. The housing accessory of claim 10, wherein said lower segment comprises:
   a first edge having a length same as said first pair of parallel edges;
   a second edge having a length less than said second pair of parallel edges; and
   a third edge coinciding with said single folding hinge.

12. The housing accessory of claim 10 further comprising: a front cover; and a hinge spine coupling said front cover and said back cover together, wherein said front cover is rotatable around said hinge spine between a storage position and an open display position, wherein said front cover at said storage position is configured to cover a front side of said mobile computing device.

13. The housing accessory of claim 10, wherein said retaining means comprises tabs protruding from said first pair of parallel edges and configured to retain said mobile computing device within said housing accessory by holding bezels of said mobile computing device.

14. The housing accessory of claim 10, wherein said angled position is user-adjustable to obtain a desired inclined position.

* * * * *